INVENTOR
SEYMOUR Z. LEWIN

United States Patent Office 3,577,244
Patented May 4, 1971

3,577,244
PRESERVATION OF LIMESTONE STRUCTURES
Seymour Z. Lewin, New York, N.Y., assignor to New York University, New York, N.Y.
Continuation-in-part of application Ser. No. 529,213, Feb. 23, 1965. This application Dec. 19, 1968, Ser. No. 785,316
Int. Cl. C09k 3/10
U.S. Cl. 106—12                                20 Claims

ABSTRACT OF THE DISCLOSURE

This application is directed to a process and composition for preserving stone objects having at least 10% calcium carbonate by maintaining the stone in contact with an aqueous solution for a sufficient period of time to improve the weathering properties of the stone. One embodiment includes applying a solution of barium hydroxide, urea, glycerin and water to the stone.

CROSS-REFERENCES

Figure 1:
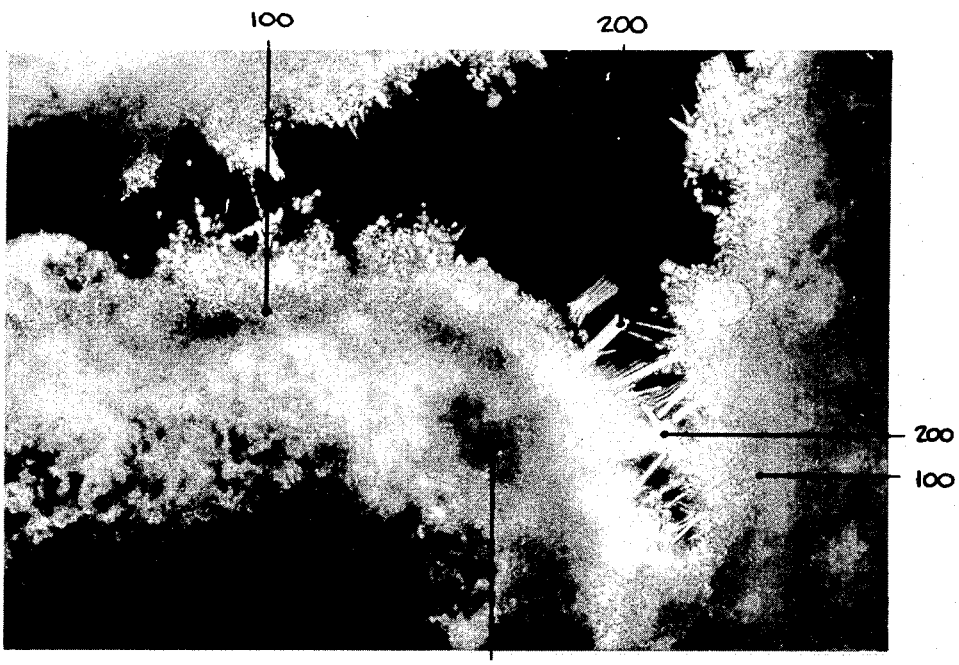

This application is a continuation-in-part of Ser. No. 529,213, filed Feb. 23, 1965 by Seymour Z. Lewin.

BACKGROUND

This invention relates to a method of preserving and strengthening limestone objects and structures. More particularly, this invention relates to a method of improving the hardness, strength and tenacity of limestone and other types of stones containing 10% or more of calcium carbonate.

A wide variety of stones is encompassed in the term limestone—ranging from hard, non-porous travertines to friable, soft tufas; from the loosely-cemented gross fragments of large seashells known as coquina, to fine-grained, well-cemented foraminiferous and/or oolitic aggregations such as Indiana limestone. These all have in common, however, the properties that (1) the predominant substance of which they are composed is calcium carbonate ($CaCO_3$), and (2) this substance is present in substantially the same physical form (i.e., particle size) in which it was originally deposited in the sediment which finally became the limestone—that is, it has not been metamorphosed (recrystallized) into the dense, massively crystalline form known as marble.

Much of the cultural and artistic heritage of mankind is made from some form of limestone and is subjected to the unremitting attack of an intrinsically hostile environment which contains a number of agents that lead inexorably to deterioration, decay, and finally, disintegration. These agents are the physical and chemical factors that operate to produce both erosion and corrosion, and include light, wind, oxygen, water vapor, precipitation, air-borne particulate matter, lichens and micro-organisms, and a variety of chemical substances that are widely distributed as minor constituents dispersed in air and water. Exterior stone work, such as statuary, monuments, frescoes, wall murals, building facades, etc., is particularly vulnerable to the attack of these agents, and many priceless works of art or historical artifacts have already been irretrievably lost as a consequence of the slow but steady action of sun, wind, rain and biological and chemical agents.

With the onset of the Industrial Revolution, a new deteriorative factor was introduced into this situation, in the form of vast quantities of soot and sulfur compounds discharged into the atmosphere in the daily course of the combustion of fossil fuels to provide energy, and the smelting of ores with coke to yield metals. As the pace of industrialization has quickened, particularly in the twentieth century, and as the rate of growth of population and technology has increased, so has the concentration of these corrosive agents in the atmosphere increased to ever more destructive levels.

At the present time, exterior stone work in industrialized regions is being subjected to increasingly aggressive attack by this air-borne sulfuric oxide, which is brought into intimate and prolonged contact with the stone through the agency of adherent deposits of soot and other colloidal matter that absorbs and concentrates the gaseous pollutant and holds it persistently at the solid surface. This type of corrosion is, at the present time, causing some stone surfaces to be suffering deleterious changes in the course of only a few years or decades that exceed by far the effects wrought previously over many centuries by the combined action of sun, wind, rain, and lichens.

The gravity of this problem is evidenced by the destructive effects of air-borne chemical agents on exterior stone work throughout the world. For example, many of the historic monuments and buildings in Rome, Florence, and other cultural centers in Italy are constructed of a porous stone, viz. travertine, that is particularly susceptible to the attack of sulfur oxides. As a consequence, such structures as the Coliseum, St. Peter's square, the baths of Diocletian, etc., are in a highly decayed state, and in many places the stone is literally crumbling away. The frescoed walls of many famous chapels such as that of S. Francesco in Arezzo and the Santa Trinita in Florence and the Scrovegni Chapel in Padua have been so seriously affected by the attack of air-borne contaminants as to have already suffered the loss of substantial areas of these priceless works of art. Outdoor sculpture in public parks throughout the industrialized regions of the world has, at the present time, a relatively short life expectancy as a consequence of these deteriorative factors.

The types of stone work that are most readily and deeply attacked by atmospheric corroding agents are the porous stone such as travertine, concrete, limestone, plaster, mortar, and alkaline stones such as those composed of carbonate, silicate, and aluminate compounds such as marble, sandstone and shale. The most aggressive corrosive agents acting on exposed stone work are generally considered to be water, sulfates and air-borne particulates.

The role of water in causing the deterioration of stone work consists in leaching out of sparingly soluble components by liquid water, causing a weakening of the binding medium that holds the individual grains together in the conglomerate and leading to powdering and crumbling of the surface. Water also causes the transport of salts from one place to another in the stone, causing efflorescence at the surface and phase transformation within the interior, with accompanying volume changes that result in fracturing, blistering and peeling of the stone. Finally the mechanical stresses produced by the freezing and attendant expansion of water condensed in the pores and capillaries of the structure leads to spalling, flaking, blistering, peeling and fracturing of the stone. The sulfate ion is an extremely destructive agent towards stone work, for since it is the anion of an acid that is much stronger than those involved in the formation of the carbonate, silicate, and aluminate stones, these latter species are readily converted by it into the corresponding sulfate compounds. In all cases the sulfate salts which are formed occupy a greater volume than did the species they have dispersed; hence, an expansion accompanies the reaction, and the stone surface spalls, cracks, flakes and powders.

The destructive effect that soot and other air-borne particulate matter such as clay dust, fly ash and organic matter has on stone work stems from the tendency of this material to settle onto the surfaces of the stone work forming an adherent deposit with a large capacity for the adsorption and concentration of air pollutants.

The commonly encountered limestones tend, in general, to be porous, and to consist to a great extent of very minute crystallites of calcite. The characteristic microstructure of a typical Indiana limestone—the Salem limestone of the Mississippian period is composed of oolites, fossil remains, and crystals deposited from solution; the latter often serving to cement together the oolites and shell fragments. The particle sizes of the individual calcite crystallites range from submicroscopic in the oolites and shells, to microscopic (up to 10–50 microns in dimensions) in the precipitated material.

When limestone is exposed to weathering, liquid water in the form of rain, condensed moisture, or capillary imbibition has ready access to the interior of the stone through the macroscopically and microscopically visible pores, as well as along grain boundaries, through cracks in the crystallites, tubules in the fossils, etc. Carbon dioxide present in the water promotes the dissolution of some of the calcium carbonate from the surfaces (particularly those of the smallest and most imperfect or strained crystallites) in contact with the liquid, according to the overall reaction:

$$CaCO_3 + H_2O + CO_2 \rightleftharpoons Ca^{++} + 2HCO_3^-$$

Sulfur dioxide and sulfur trioxide present in the water as a consequence of air pollutants in the atmosphere cause some of the calcium carbonate in the surfaces contacted to be dissolved in the form of the ions of calcium sulfite and sulfate, according to the overall reactions:

$$CaCO_3 + H_2O + SO_2 \rightarrow Ca^{++} + SO_3^= + H_2CO_3$$

$$CaCO_3 + H_2O + SO_3 \rightarrow Ca^{++} + SO_4^= + H_2CO_3$$

The total amount of calcite dissolved by these mechanisms is ordinarily only a very minute fraction of the mass of the stone, even over periods of centuries. However, this small proportion of dissolved material can be the cause of major deterioration of the stone in the following way.

When the stone dries out after a wetting, it does so by evaporation of water from the exposed outer surfaces. As these surfaces dry, the liquid still present in the interior migrates to the surface due to capillary forces—the same process is involved as is responsible for the migration of water into a blotter. Since the water that evaporates from the exposed surfaces leaves behind any dissolved solid material it had been carrying, and since all the water from the interior eventually evaporates at the surface, all the matter dissolved by all the water that had penetrated into the stone is transported to, and deposited at the surface.

The calcium bicarbonate that is in solution is deposited at the surface as calcium carbonate, and forms a scale that is sometimes termed "sinter," or creates excrescences such as "drip stones."

The calcium sulfate and sulfite in solution is deposited at the surface as gypsum, $CaSO_4 \cdot 2H_2O$, the sulfite undergoing oxidation at the surface to yield sulfate. The gypsum deposit is often easily recognizable as an extremely white layer immediately under the surface dirt and soot.

Deposition at a stone surface of any material from solution is a deleterious factor, for the precipitate forms not only on top of the outermost boundaries, but also in all the pores, cracks, and channels which open out to the surface. As the deposited particles grow by accretion of new matter from the solution, crystallization pressures are built up. The mechanism is similar to the shattering effect produced by the expansive force generated when liquid water freezes to ice in a confined space. The eventual result of repeated cycles of wetting, salt deposition during drying, rewetting, etc., is large-scale cracking, spalling, and crumbling of these surfaces. If there are large cracks or planes of weakness present in the stone, the expansive forces resulting from surface deposition can lead to the breaking off of large pieces, and even the entire destruction of an object.

The formation of a layer of gypsum at the surface of exposed stone is particularly undesirable, for not only does it produce the effects just described, but its appreciable water solubility (2.3 grams per liter at ordinary temperatures) exaggerates these effects and creates other problems as well. Once a layer of gypsum has been formed, water soaking into the stone tends to pick up some of the substance on its way in, thus raising the solids content of the liquid which will ultimately evaporate at the surface, where it redeposits this material together with whatever additional matter has been leached out of the interior. The rate of deterioration stemming from the surface deposition phenomena is thereby markedly increased.

The solubility of gypsum in water is also largely responsible for the disfiguring streaking of exposed stonework that is commonly observed after even relatively brief periods of exposure to the modern industrial atmosphere. Air-borne particulates tend to settle on, and become attached to exposed limestone surfaces, and the object becomes gray and finally black with time. Rain does not wash away this grime, but if there is a gypsum deposit on the surface, the flow of liquid water over it does dissolve some of the gypsum, and in this process the grime is loosened and carried away. Since liquid water follows preferential paths in flowing over a stone surface, determined by the presence of projections, irregularities, and differences in wettability, the grime that is removed delineates this pattern of water flow, and the result is often a disfiguring mixture of random streaks of pure white on an otherwise dark surface.

If a porous stone is in intimate contact with other materials which contain soluble salts, water will carry these salts in solution into the stone, and when the stone dries out, the salts are deposited at its exposed surfaces, with all the undesirable consequences detailed in the preceding paragraphs. Particularly dangerous for limestone are soils having a high salt content, and bricks which have not been fired at sufficiently high temperatures to volatilize the sulfates present in many clays. In general, soluble sulfates cause the most trouble, probably because their alkali salts are highly hydrated in damp atmospheres, and there are large relative volume changes (and hence great forces) involved in the dehydration—hydration processes which accompany the frequent cycling between dry and wet conditions to which nearly all exposed stone is subject.

Experts in the field of stone and concrete technology, art scholars and historians, and officials charged with the care and preservation of sculpture and monuments all are unanimous in their evaluation of the seriousness and urgency of this problem. It is therefore not surprising that numerous and varied efforts have been made to solve and/or alleviate the gravity of this problem.

The expedients that have been adopted with respect to the preservation and/or restoration of artistic stone work generally fall into two categories: (1) efforts, essentially purely mechanical in nature, directed towards the strengthening and consolidating of specimens, the surfaces of which have been rendered friable and flaky, and (2) measures aimed at diminishing the chemical attack-ability of the surface, either by coating the surface with a more-or-less impermeable film, or by modifying the chemical nature of the stone at and near the surface.

One method for treating decayed stone work which was developed at the turn of the century involved the application of a solution of barium hydroxide. This method at one time was considered applicable for the treatment of stone which had been disintegrated by the action of sulfuric acid. The barium hydroxide was considered to react with calcium sulfate in the stone to form barium sulfate. The barium hydroxide solution was applied by a conventional painting technique after which the solution was allowed to dry. This process has been generally discredited since it led to the formation of a crust on the stone which would subsequently fall off.

Efforts towards strengthening and consolidating specimens whose surfaces have been rendered friable and flaky have involved for example dipping or brushing the specimen with a solution or emulsion of polyvinyl acetal or acetate in a suitable solvent after which the solvent is allowed to evaporate, depositing the polymer in the stone. Another method having the same object involves treating the specimen with lime water leaving a film of the dissolved calcium hydroxide in the pores, capillaries, and fissures of the stone. Carbon dioxide invariably present in the air converts the calcium hydroxide into calcium carbonate thus building up the stone. Alternatively, the lime water treatment is followed by one or several brushings with a water dispersion of a soluble casein preparation. When the protenaceous material comes into contact with the calcium hydroxide, it forms a precipitate of calcium caseinate which has adhesive properties. Another prior art process involves exposing the specimen to the vapor of methyl methacrylate in order to impregnate the surface layers with this substance. The specimen is then impregnated with benzoyl peroxide by forcing the latter into the pores under pressure. The benzoyl peroxide functions as a polymerization catalyst, and when the specimen containing the monomer and the catalyst is heated, polymethyl methacrylate forms in situ. Alternatively, the object is brushed with a 0.5–1.0% solution of polymethyl methacrylate in a suitable solvent. Another prior art process involves brushing the surface of this specimen with an emulsion or solution of a synthetic resin of the urea-melamine type and allowing the solvent to evaporate. Another prior art process involves impregnating the surface of the specimen with a metal soap such as aluminum stearate, zinc stearate, etc. by using an organic solvent as a vehicle to carry the metal soap into the stone surface. Another prior art process involves filling large cracks in the object with an epoxy resin monomer and catalyst, the polymerization reaction yielding a high strength bonding material that holds the fractured surfaces in place. Another prior art process involves heating the specimen to drive out any moisture and to expand the air contained in the pores. The specimen is then coated with a salve of beeswax and petroleum ether, or is immersed in a tank of molten wax. Upon cooling, the contraction of the internal air helps to impregnate the surface with the wax. Another prior art process involves applying to the specimen a dilute solution of a silicon ester in alcohol in the form of a spray by an atomizer held some distance from the stone surface. Upon standing in air, the ester decomposes, depositing a coating of silica on the grains of the stone.

These techniques have been employed successfully in certain instances to strengthen an ancient object sufficiently to permit it to be stored or displayed safely. Indeed this is the only application to which most of these methods lend themselves, since for the best results they require that the object be small enough to be placed in a bath or otherwise handled or manipulated. Furthermore, the adhesive applied tends to be deposited almost entirely upon the outer-most layer of the stone tending to form a vapor-impermeable seal which prevents the stone from "breathing" and which is itself easily broken by the expansion of the air trapped within the stone. Furthermore, the adhesive material itself is not impervious to chemical attack by sulfuric acid. These techniques are not suitable for the in situ treatment of large statuary, frescoed walls, building facades, etc., either because of the difficulty of carrying out the treatment or because the bonding of the deposited medium to the stone is insufficiently permanent and the medium itself is insufficiently inert and unreactive when exposed to normal industrial atmospheres.

The approaches in the prior art directed towards diminishing the chemical attackability of the surface of the stone specimen involve many of the consolidation treatments described above since these treatments also serve to coat the surface of the stone with a material that functions to a limited extent to protect the stone from further attack. In the case of surfaces that do not require consolidation, a preservative coating is sought to be obtained by brushing the stone with such substances as water glass, silicone resins, silicon esters, tung oil, boiled linseed oil, natural and synthetic resins, bitumen, chlorinated rubber paint, etc.

This technique is generally unacceptable for the preservation of artistic or historic exterior stone work, because a layer of coating material on top of the stone that is thick enough to be protective over a period of years would change the surface appearance to much to be admissible, and a layer thin enough to be unobjectionable on esthetic grounds is not protective enough in normal industrial atmosphere. It has not proved practical to achieve substantial penetration of any of these coating materials beneath the topmost surface of stones that are not in an advanced state of decay.

Another prior art process directed towards diminishing the chemical attackability of the surface involves brushing the surface of the stone specifically with solutions of magnesium, aluminum or zinc fluosilicates, hydrofluoric acid, fluosilicic acid, or similar substances. This method tends to convert some of the stone in the surface of the object into calcium fluoride, aluminum fluosilicate, or other related species which are chemically more resistant to atmosperic attack than the original stone. Another prior art process involves placing the specimen in a vacuum chamber, exhausting the air and then introducing silicon tetrafluoride gas into the chamber which gas diffuses into the pores of the stone converting calcium carbonate and silicate into calcium fluoride and depositing silica at the same time.

Despite the obvious seriousness of the problem of the conservation of exterior stone work and despite the efforts of a number of technologists and conservators who have from time to time been faced with the necessity of finding expedients for the treatment of exposed stone surfaces, there is at the persent time no satisfactory technique available that is of even limited applicability. Those techniques of the prior art that depend upon the impregnation of the surface of the stone with a layer of inert material are not at the present time capable of yielding a result that is effective for more than a few years at most under exposure to average atmospheric conditions. If the impregnant is an organic polymeric material such as shellac, wax, resins, polyvinyl acetate, etc., it is in practice not possible to achieve any significant penetration below the topmost layer and the strength and durability of the coating are poor. In addition, since the body of the stone contains air in pores, crevices and fissures, a continuous surface coating serves to trap the air beneath it and the expansion and contraction of this trapped air that attends the inevitable variations in ambient temperature leads to stresses on the surface that become manifest in the form of peeling, blistering, and powdering of the stone. A hydrophobic water repellent coating on the surface of a porous stone interferes with the normal diffusion of water into and out of the stone and tends to accentuate rather than diminish the volunerability of the stone to the deleterious effects of freezing water. Finally, surface coatings of this class tend to change the texture, reflectivity, or color of the surface of the stone work an are esthetically undesirable.

The techniques that are based upon the impregnation of stone with a vapor of a monomer that can be subsequently polymerized in situ are in principle capable of yielding an impregnating layer that is relatively deep and hence mechanically strong and durable. However, these techniques are still in the experimental stage and great difficulties afflict the polymerization step. It is difficult to get the catalyst into the stone in the same depth as the monomer and in uniform concentration, and it is difficult to initiate the polymerization reaction and carry it to completion everywhere. Finally, the technique is limited to objects that can be inserted into an evacuable container, and hence is not applicable to large statuary or to building facades, murals, etc.

Techniques based upon the chemical modification of the stone either by deposition of a silicious material or by reaction of the stone with a fluoride-containing agent have been found seriously wanting in their present mode of employment. The chemical change occurs in only a very thin layer of the stone and the protection afforded the underlying substance of the specimen suffers attenuation relatively rapidly. When silica or calcium silicate is deposited on the stone, the deposit is composed of these species in a reactive state, and corrosion of the deposited material occurs readily. When fluorides are employed, the calcium fluoride or aluminum fluosilicate first formed on the surface prevents access of the remainder of the reagent to the stone underneath and the protective film resulting is so thin that it is easily breached. If more drastic conditions are attempted during the chemical treatment in an effort to increase the thickness of the layer of fluoride, difficulties are encountered due to the tendency of the new phase to expand or compress the crystalline lattice of the original material, and thus to create micro-cracks, blisters, and flakes.

Any process for the conservation of artistic and historic stone work requires that the protection be complete and long-lasting, i.e., deterioration must be fully arrested after treatment for a period of at least several years under average conditions. The treatment to which the stone is subjected must not substantially alter the appearance of the surface and the treatment must be applicable in the field under average outdoor conditions and to objects in situ, whether large or small.

It is therefore an object of this invention to provide processes for improving the hardness, strength and durability of marble, limestone and other types of stone containing 10% or more of calcium carbonate.

It is another object of this invention to provide processes and compositions for preserving and strengthennig decayed, deteriorated and eroded objects and structures composed of marble, limestone and other stone containing 10% or more calcium carbonate.

It is another object of this invention to provide processes and composition for reducing the porosity of marble, limestone and other stone containing 10% or more calcium carbonate.

It is a further object of this invention to provide processes and compositions for increasing the density of marble, limestone and other stone containing 10% or more calcium carbonate.

It is a further object of this invention to provide processes and compositions for reducing the susceptibility of sculpture and other art work containing 10% or more of calcium carbonate to decay and deterioration under normal conditions of exposure and atmosphere.

It is still a further object of this invention to provide processes and compositions for the protection of stone works of art containing at least 10% calcium carbonate by fully arresting the deterioration of the stone for at least several years under normal atmospheric conditions.

These and other objects will be readily apparent from the following detailed description.

In the light of the experience that is available from previous attempts at preserving limestone, the only type of impregnating agent likely to prove successful is one which combines the following properties:

(1) It should be a stable, insoluble, inorganic species that can be caused to penetrate uniformly throughout the bulk of the stone and then be immobilized therein.

(2) It should be crystallographically very similar to calcite, so that the deposited material can build onto the calcite crystal, lattice, forming a firm, permanent bond to it and serving to bridge and bind together adjacent calcite particles.

(3) It should either be chemically unreactive to the oxides of sulfur and their products (sulfuric acid, sulfate ion), or should react with them to form an unreactive, protective layer, thus barring further attack by these air pollutants on the stone.

(4) It should be intrinsically colorless.

(5) Its mechanical and thermal properties should be very similar to those of calcite.

The present invention is directed to a method of impregnating, and an impregnating agent for stone that fulfills these requirements.

THE INVENTION

According to this invention, there is provided a process and composition for preserving stone objects having at least 10% calcium carbonate which comprises maintaining the stone object in contact with an aqueous solution of hydroxides or soluble salts of barium or strontium for a period of time sufficient to cause the transformation of the smallest size particles into larger crystals throughout a substantial portion of the stone without significant change in the color, texture, volume or external appearance of the stone. The barium carbonate, for example, which is formed, does not merely precipitate as discrete particles; instead, it induces a recrystallization of the surfaces of the cacite particles, forming with them series of solid solutions of barium calcium carbonate. As set forth in greater detail below, the aqueous solution may also comprise a humectant and an agent which releases carbon dioxide.

Many stone works of art generally contain significant amounts of oolitic limestone or travertine limestone which may be either hard or soft. The structure of oolitic limestone generally consists of a center or nucleus of moderate size grains around which has been built up a sheet of very fine particles. The outermost layer or skin of this sheet is occasionally composed of particles which are slightly larger than those composing the bulk of a sheet. Between the individual oolites moderate to large size crystal grains are present, serving to fill in the interstices of the structure. Travertine limestone is composed primarily of very small but well-defined crystals of calcite. In the case of hard marble-like travertine the crystallites are fairly large, the average size being about 0.1–0.05 mm. The soft travertine consists of much smaller, less densely packed crystallites having an average particle size of about 0.01 mm. The soft travertine may contain fewer and smaller visible pores than does the hard travertine so that the bulk density is greater for the former despite the less dense packing of the individual crystallites.

The presence of a substantial portion of very minute crystallites in the structure of a limestone is responsible to a great extent for the deterioration of stone works under normal atmospheric conditions. I have found, for example, that the structure of oolitic limestone which has been subjected to a stream of water for a period of one month, has been changed such that the water has leached away those portions of the structure which consisted of the smallest particles, leaving behind a skeleton network of the larger crystals. I have also found that when a limestone object has been placed in contact with quiescent water for an extended period of time, the smallest particles in the limestone have disappeared and their places have been taken by a smaller number of larger, better-formed, more massive crystals.

While the recrystallization of the small particles of limestone into larger, better-formed crystals may take place when water is applied to a limestone object and maintained in a quiescent state for extended periods of time, I have found that the periods of time are much too long to be of practical applicability. I have found, however, that this recrystallization process may be speeded up if solutes are present in the aqueous medium. The most pronounced catalysts for the recrystallization phenomenon have been found to be aqueous solutions of barium hydroxide and strontium hydroxide, or any of the soluble barium salts, or the soluble strontium salts. Thus, among the preferred catalysts of this invention, in addition to barium hydroxide and strontium hydroxide, are for example, barium chloride (BaCl$_2$), barium nitrate (Ba(NO$_3$)$_2$), barium thiocyanate (Ba(CNS)$_2$), barium perchlorate (Ba(ClO$_4$)$_2$), strontium chloride (SrCl$_2$), strontium nitrate (Sr(NO$_3$)$_2$), strontium thiocyanate (Sr(CNS)$_2$) and strontium perchlorate (Sr(ClO$_4$)$_2$). Solutions of barium hydroxide have proven most effective in the present invention.

The catalysts should be added to the water in concentrations of at least 0.01% by weight. There is no upper limit in the amount of catalyst that may be added except that dictated by economics. I prefer to add catalysts in amounts of about 5 to 10% by weight based on the weight of the water solution. For optimum results, the barium or strontium hydroxide should be as concentrated as possible—preferably saturated or super-saturated.

These catalyst solutions may be used by applying them to stone objects in any convenient manner. However, in order to achieve the beneficial effects of this invention, the stone object must be maintained under a moist condition. The mere application, for example, of barium hydroxide, to a stone object, or even the repeated application of such a solution will not produce a satisfactory or lasting improvement. Such solutions quickly dry under atmospheric conditions, at which point the process of crystallographic improvement ceases. Upon evaporation of the solution, the solute deposits as a powder and is leached out of the stone. Therefore, the use of these solutions is most practical for small objects that can be immersed in an aqueous solution and maintained in this condition for from 1 to 4 weeks at room temperature. At elevated temperatures of from 50 to 100° C., the stone object need only be immersed for one to two days. Thus, the period of immersion is inversely proportional to the temperature of the solution. Alternatively, the stone object may be maintained in a controlled and humid atmosphere after application of the catalyst solution or a fine spray of water may be applied, for example, on a daily basis.

I have also found that the recrystallization process is aided if there is present along with the catalyst a compound which decomposes in alkaline solution to release carbon dioxide and which does not leave any soluble residue. For example, when urea is added to a solution containing barium hydroxide, the urea slowly decomposes, yielding ammonia and carbon dioxide. The carbon dioxide released from the urea reacts with the barium hydroxide, converting it to insoluble barium carbonate. The barium carbonate is formed at a slow and continuous rate in all the pores and channels of the stone and undergoes crystal growth and recrystallization under the influence of the aqueous medium in the same way as the calcite crystallites. Thus, the desirable effects of the recrystallization process are by this means supplemented and reinforced through the simultaneous deposition and incorporation of barium carbonate throughout the bulk of the stone. The reaction continues until all the barium hydroxide has been converted to barium carbonate. The ammonia produced during the decomposition is allowed to escape into the atmosphere.

Similar carbon dioxide-generating reactions occur with other compounds such as parabanic acid, trichloroacetic acid, alloxan, barbituric acid, allantoin, hydantoin, uric acid, ethyl carbonate, urethane, ammonium carbamate, biuret, semicarbazide, hydrazine dicarboxylic acid amide, or cyanamide. The above-mentioned assistant catalytic agents may be used either singly or together in concentrations greater than 0.01% by weight. I prefer to use these compounds in amounts ranging from 3 to about 20% by weight, for example, based on the weight of the water.

Barium hydroxide is a particularly good form in which to introduce the barium moiety because (1) it has a high solubility in water, (2) it diffuses readily into limestone, (3) it is strongly adsorbed onto calcite surfaces, and (4) the high pH of its solution promotes the decomposition of urea into ammonia and carbonate ion. The latter process, viz.:

$$CO(NH_2)_2 + 2OH^- \rightarrow CO_3^= + 2NH_3$$

occurs very slowly at room temperature (requiring months for completion), but rapidly at the boiling point of the solution. Hence, the limestone blocks may be allowed to soak in the solution at room temperature for a day or more to allow maximum penetration of the dissolved components without appreciable reaction. The system is then raised to the boiling point to accelerate the decomposition of the urea. The carbonate ions thus liberated react with the barium hydroxide:

$$Ba(OH)_2 + CO_3^= \rightarrow BaCO_3 + 2OH^-$$

Hence, the overall reaction corresponds to:

$$Ba(OH)_2 + CO(NH_2)_2 \rightarrow BaCO_3 + 2NH_3$$

This equation shows that another advantage of the use of barium hydroxide is the fact that when present with urea in stoichiometric proportion, there are no soluble salts formed as byproducts of the reaction.

It has been found advantageous to keep the solution at the boiling point for several hours; this facilitates and accelerates the formation of the solid solutions of barium calcium carbonates at the surfaces of the calcite particles.

In the case of a limestone having a water absorption capacity of 5%, the procedure outlined above results in the deposition within the stone of an amount of barium carbonate corresponding to about 0.5% of the weight of the stone. If it is desired to increase the amount of the deposited phase in the stone, one method is to dry the block, immerse it in a fresh Ba(OH)$_2$-urea solution until permeated, and then heat as before. This treatment may be repeated as often as desired, each cycle depositing more barium carbonate throughout the stone.

In carrying out the process of this invention, the limestone which is to be treated may be immersed in the water solution containing any of the catalysts mentioned above or the surface of the limestone may be coated with a water solution containing the catalyst in order to bring about the desired recrystallization. In those instances where the object is too large to immerse it in a water solution, it has been found suitable to apply the water solution to the surface of the object by spraying, brushing or by means of a roller.

When the solution is to be applied to the surface of the object exposed to atmospheric conditions, I use humectants such as glycerin, other glycols, sucrose, etc., to prevent the premature drying of the stone and to promote the recrystallization process. In a preferred embodiment, the barium or stronitium hydroxide concentration may be any convenient value in the range between 1 and 30 parts by weight per 100 parts of the glycerin-water solvent mixture. For optimum results, a supersaturated solution of Ba(OH)$_2$ is preferred, containing 20 parts by weight of $$Ba(OH)_2 \cdot H_2O$$

per 100 parts of a solvent mixture composed of 25 parts by volume of glycerin and 75 parts by volume of water. Because of the presence of the glycerin, this solution is indefinitely stable and the excess of the barium hydroxide over the equilibrium saturation solubility does not precipitate out as long as the solution is not seeded. The concentration of urea may be any value in the range between 1 and 50 parts by weight per 100 parts of the solution, preferably 5 to 10 parts. The solvent mixture may contain glycerin in the range between 5 and 75 parts by weight per 95 to 25 parts, respectively, of water, preferably 25 parts glycerin to 75 parts water. This composition is applied to the calcareous stone by any convenient means, such as brushing, spraying, swabbing or pouring. A sufficient quantity is used to soak into the stone as deeply as the innate porosity of the stone permits; any standard commercial wetting agent that is compatible with the other ingredients of the liquid may be added to facilitate the penetration of the liquid into the pores of the stone. The treated stone is then left exposed to air, but protected by a shield, plastic sheeting, or any other convenient means, from direct contact with rain or other form of copious liquid flow over the stone surface for a period of 2 to 4 weeks, after which the chemical effects have been achieved and the remains of the glycerin-containing liquid may be washed away from the stone, either by hosing the stone with a stream of water, or allowing rain to wash over the stone.

Without wishing to be bound by any theory, I believe my process and compositions induce and control the recrystallization of minute crystallites within the structure of a limestone so as to reduce the number of minute crystallites thereby decreasing the internal surface area and decreasing the adsorptive and absorptive capacity of the stone for discoloring and deteriorating pollutants. The growth of large crystals in place of the smallest ones tends to decrease the internal network of inter-particle channels and capillaries, thereby slowing up the rate of penetration of corrosive agents and of leaching out of solubilized materials. In the process of growth, bridges tend to form between contiguous crystallites and a three-dimensional network of partially and wholly fused crystals is formed, thereby greatly increasing the strength, cohesion and hardness of the stone. The recrystallization occurs throughout the bulk of the object, wherever the aqueous solution penetrates and does not produce merely a surface alteration of properties.

The application of this process permits restoration of entire works of art or the selective restoration of a part of works of art. For example, if macroscopic holes, cracks, lacunae, etc. in the stone are filled with finely powdered calcium carbonate, either mechanically or by precipitation from solution, this new material can be caused to recrystallize and fuse with and become an integral part of the surrounding stone. Thus, the breaks are repaired and the pores filled with a material that is chemically and physically identical with the remainder of the stone and hence does not break down, separate, alter or corrode differently from the stone during the subsequent life of the object.

The processes of this invention permit the incorporation of a fungicide, bactericide and/or insecticide in the treating solution such that the fungicide, bactericide and insecticide become an integral part of the limestone object and thus aids in preventing deterioration of the object by means of micro-organisms, air pollutants, etc.

In addition, the processes of this invention permit the making of casts and reproductions of works of art by the use of limestone powder by causing the powder to fuse into a solid stone without the addition of any adhesive, binder or cement. Furthermore, the application of this principle permits the upgrading of large, relatively uneconomic deposits of limestone into economical commodities by the flooding of quarries with the solutions of this invention, thereby permitting recrystallization to take place in the limestone deposit of the quarry to produce more economically valuable materials. The addition of catalysts to quiescent water employed in the process permits the upgrading to take place within relatively short periods of time, thereby making the process economically feasible.

For a more detailed understanding of the invention, reference should now be had to the following examples which are intended for illustrative purposes only, as obvious modifications will be apparent to those skilled in the art.

Example 1

Several blocks of the limestone specimens had ¼″ holes drilled into them and the holes filled with finely ground chalk mixed with powdered charcoal to impart a distinctive color to the added material. After one month of immersion in a water solution containing 8% by weight of barium hydroxide and 4% by weight of urea, the chalk powder was found to have recrystallized and fused to a solid that was as hard and coherent as the remainder of the original stone, the original stone having become harder, stronger and less porous than it was before the treatment. The added chalk dust was directly bonded to the surrounding stone as well as to itself. Measured on a Mohs' hardness scale, the soft, friable travertine was found to have increased in induration enough to raise its hardness from the rank of 2 to 4. These changes in the specimens were not associated with any appreciable modification in the gross appearance of the stone, the color and texture remained substantially as they were before the treatment. There was no evidence of any tendency toward a volume increase, skin formation, crack or fissure production, or other alteration of the stone.

Example 2

A stone was treated with a solution containing 25 parts by weight of barium hydroxide, 25 parts by weight urea, 50 parts by weight of glycerin, and 50 parts by weight of water. The solution was applied by means of a brush and the stone was kept wet by spraying with water once a day for a month. The stone was analyzed at the end of that time and it was found that the desired recrystallization had taken place throughout the stone. In an alternative embodiment, after application of the solution of barium hydroxide, urea and glycerin, the stone object may be covered with a polyethylene sheeting, to protect the stone from the atmosphere and to help maintain the stone in a moist condition. This eliminates or reduces the need to subsequently spray the stone with water, depending on atmospheric conditions.

Example 3

A limestone was immersed in a solution containing 5% of strontium hydroxide by weight and 6% by weight of parabanic acid. The stone was allowed to stand in this medium for one month, whereupon it was removed, rinsed with water and allowed to dry. The stone was analyzed and it was found that the desired recrystallization had taken place throughout the stone.

Example 4

A stone was sprayed with a solution containing 25 parts by weight of strontium nitrate, 25 parts by weight of barituric acid, 50 parts by weight of ethylene glycol and 50 parts by weight of water. The stone was kept wet by spraying with water once a day for one month. At the end of that time, the stone was analyzed and it was found that the desired recrystallization had taken place throughout the stone.

Example 5

A stone was coated by roller with a solution containing 25 parts by weight of barium hydroxide, 25 parts by weight of allantoin, 50 parts by weight of ethylene glycol and 50 parts by weight of water. The stone was kept wet by spraying with water once a day for one month. At the end of that time, the stone was analyzed and it was found that the desired recrystallization had taken place throughout the stone.

Example 6

The nature of the phenomenon is illustrated by the following experiment. Two large single crystals of transparent calcite (Iceland spar) were mounted close to, but not touching each other, and were immersed in a solution that contained 5% $BaCl_2$ and 5% urea. After standing in this solution at room temperature for one month, the calcite crystals were found to have become firmly cemented together. The annular space of about 0.1 mm. between the crystals had been bridged across by material which had formed from the solution.

A cross-section through this cemented region was mounted on a glass slide and ground down to yield a petrographic thin section. A new, needle-like growth was clearly seen in the region between the two sets of cleavage rhombs corresponding to the two original single crystals.

Electron beam microprobe scans across this cross-section showed the continuous nature of the series of solid solutions, which consist of barium carbonate dissolved in calcium carbonate close to the original calcite surfaces, merging into solutions of calcium carbonate in barium carbonate as the distance from the original calcite increases, until the deposit becomes pure barium carbonate.

The region of solid solutions was about 10 microns thick. It is the continuous and gradual nature of this transition region between the original calcite and the new crystals of barium carbonate that accounts for the excellent adhesion of the new phase to the calcite, and its ability to serve as a cement between calcite particles.

Example 7

A large number of test blocks of 4" x 4" x 2" of Indiana limestone, of the type used for building blocks, was obtained from a quarry. The test blocks were divided into three groups. Group A comprised control blocks which were untreated. The blocks of Group B were treated with a 5% aqueous solution of $Ba(OH)_2$ by a conventional painting technique. Groups A and B are referred to below as the "control" specimens. The blocks of Group C were treated in accordance with the present invention, by immersion in an aqueous solution of 7% $Ba(OH)_2$, and 5% urea at 90° C. for 24 hours. They are referred to below as the "treated" specimens.

The recrystallization, particle-to-particle bonding, and deposition of barcium carbonate on internal and external surfaces achieved by the procedure described above results in certain remarkable improvements in the properties of the stone. In order to provide an objective measure of these effects, a series of tests has been carried out on a typical Indiana limestone, viz. the Salem limestone of the Pennsylvanian period.

The standard A.S.T.M. test procedures for modulus of rupture, compressive strength, coefficient of absorption, resistance to abrasion, and specific gravity were carried out on each group.

In addition to these standard tests, the following ad hoc testing was carried out.

(1) Resistance to air pollutants.—Pairs of prisms of the Salem limestone, 2 x 2 x 1-inch were mounted side-by-side in a container fitted with a recirculating Vanton Teflon pump, so that a uniform flow of the liquid discharged from the pump was distributed equally and simultaneously over the top 2 x 2-inch surfaces of both specimens. In each run one prism was a control, the other a treated specimen. The fluid passing over the stones was 1% sulfuric acid for two days; this was then removed and replaced by distilled water which was circulated over the stones for two days. The rate of flow of the solutions over the specimens was 800 ml. per minute.

Table I shows the weight changes experienced by the specimens. It is evident that the treatment of the limestone by the present process has imparted to it a much greater resistance to the erosive effect of dilute sulfuric acid solution than was characteristic of the untreated stone. This is due to the fact that the sulfuric acid reacts with the barium carbonate present on the calcite surfaces of the treated specimens converting the outermost surface to $BaSO_4$ which is extremely water-insoluble (0.2 mg. per liter at room temperature), and which forms a protective coating on the surfaces of the stone. Thus, as soon as a thin layer of $BaSO_4$ has formed, the stone is protected from further attack by the acid, by water, or by any other substances likely to be in e.g. rain water (including dissolved carbon dioxide).

In addition to attacking the calcium carbonate of limestone, another of the effects of the dilute sulfuric acid solution on the untreated stone is to cause it to darken in color, due to oxidation and hydrolysis of the traces of iron compounds present in the stone. By contrast, the treated specimens are lightened somewhat in color under the same conditions, due to the formation of the white $BaSO_4$, and its protective effect on the remainder of the limestone.

Since in the normal weathering of limestone in modern urban atmospheres the primary reaction occurring is the action of sulfur oxides and water (i.e., effectively, dilute sulfuric acid) on calcite, the exposure of limestone treated according to the present process will result in the formation of the protective $BaSO_4$ coating, both internal and external, which has been evident in these tests. This will result in the following advantageous features:

(1) The stone will not erode as rapidly as if untreated.

(2) The formation of soluble salts, viz calcium sulfate, which can dissolve in the water wetting the stone and migrate with it, producing damaging efflorescences when the water ultimately evaporates, will be greatly reduced.

(3) The disfiguring streaking of the stone as it ages, due to the presence under the surface grime of a layer of slightly soluble matter which tends to be washed away unevenly by rain will be minimized.

TABLE I

[Weight loss by erosion in 1% $H_2SO_4$ and in $H_2O$]

| Number: | Control group | Weight Before | Weight After | Percent change |
|---|---|---|---|---|
| 1 | A | 133.1 | 127.8 | −4.0 |
| 2 | A | 147.2 | 139.8 | −5.1 |
| 3 | A | 141.8 | 135.3 | −4.7 |
| 4 | B | 147.1 | 140.8 | −4.3 |
| 5 | B | 145.3 | 138.2 | −4.9 |
| 6 | B | 140.6 | 133.1 | −5.3 |
| 7 | C | 147.6 | 146.1 | −1.0 |
| 8 | C | 150.6 | 149.8 | −0.5 |
| 9 | C | 147.3 | 146.4 | −0.6 |

(2) Resistance to salt migration.—A soluble salt occasionally encountered in efflorescences on limestone is sodium sulfate. It almost always comes from bricks, concrete, or mortar in contact with the stone, and migrates into the latter in wet weather. It is highly deleterious, and a major source of stone decay.

The tendency of sodium sulfate to migrate into both treated and control limestone specimens was tested as follows. Prisms, 2 x 2 x 1-inch, were provided with a ½-inch flange of beeswax along the perimeter of their upper 2 x 2-inch faces. The prisms were then immersed in a 5% $Na_2SO_4$ solution until the liquid just reached the underside of the wax flange.

The solution soaked into the stone, and, after some time, the exposed upper surface was observed to be completely damp. It is significant to note that there was a marked difference in the time necessary for the solution to penetrate through the treated and control prisms and become visible at the top surfaces. The control prisms were completely permeated in 10–15 minutes; the treated prisms did not reach a corresponding state until 45–60 minutes had elapsed.

Evaporation of the moisture from the exposed free surfaces of the prisms was promoted by directing the breeze from a fan over them. The beeswax flange prevented any liquid from creeping up the sides of the stone specimens and evaporating to deposit salt at the top surface. Thus, the only salt that could be deposited on the exposed surface was carried through the bulk of the stone by the liquid migrating toward the surface and evaporating there.

To illustrate a typical comparison of the amounts of salt efflorescence built up on the exposed surfaces of treated and control prisms in a 24-hour period the efflorescences were scraped from the surfaces and weighed, with results as given in Table II.

It is evident that the treated limestone prisms offer a pronounced resistance to the passage of sodium sulfate through their bulk. This is directly attributable to the presence of the barium carbonate in these specimens, and probably arises from a combination of specific absorption and chemical reaction with the sulfate ions.

TABLE II

[Quantity of efflorescence on 2 x 2 x 1 prisms from 5% Na₂SO₄ in 24 hours]

| Number: | Control group | Weight of efflorescence (grams) |
|---|---|---|
| 10 | A | 0.51 |
| 11 | A | 0.73 |
| 12 | A | 0.65 |
| 13 | B | 0.60 |
| 14 | B | 0.69 |
| 15 | B | 0.70 |
| 16 | C | 0.00 |
| 17 | C | 0.00 |
| 18 | C | 0.05 |

(3) Internal structure.—Sections were cut through a number of the treated and control limestone blocks in various directions, and petrographic thin-sections were prepared. A staining technique employing rhodizonic acid permits the locations of appreciable concentrations of barium species to be visualized without interference from the calcium carbonate.

Figure 2:
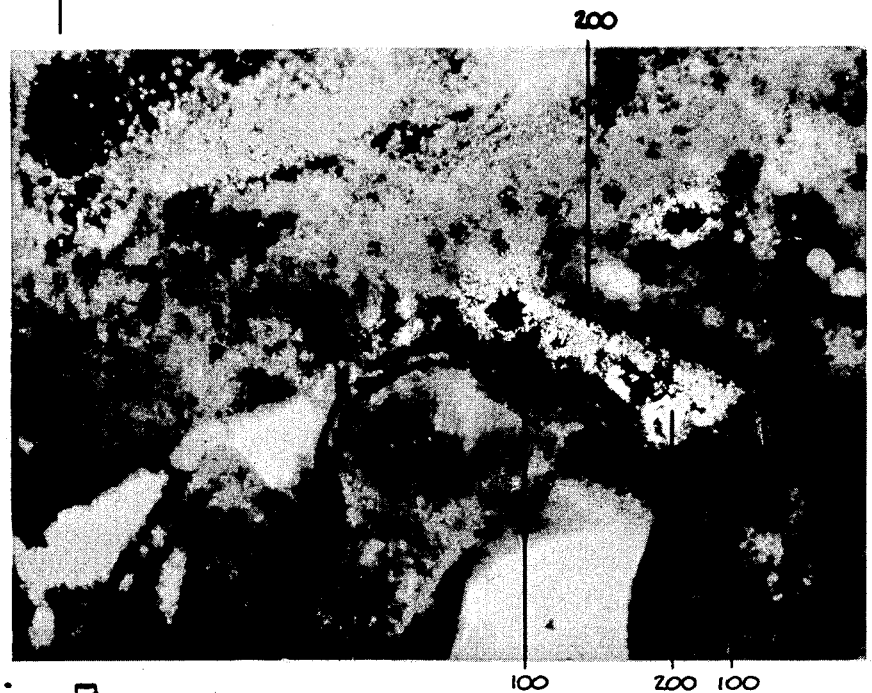

A characteristic feature of the treatment of Salem limestone by the process described is the formation of distinct "reaction rims" at the peripheries of the fundamental particles (which are primarily skeletal remains) of the stone. These are shown in FIGS. 1 and 2 (respective actual magnifications, 1200× and 60×), by reference numeral 100. These reaction rims are rich in barium and stain distinctively. Many of the skeletal particles have one or more roughly spherical "nuclei" in their interiors (perhaps these were originally droplets of carbonatitious mud); these become very deeply stained by the rhodizonic acid, showing that they have picked up a great deal of barium. Because both types of sites evidence no sign of any change in the form or structure of the original particles, it may be concluded that the mechanism by which the barium has penetrated the crystal structure is direct ion exchange with calcium. It is significant that this effect is observed primarily where the calcite crystallites are smallest, most imperfect, and with the greatest surface-to-volume ratio. This form of penetration and impregnation of the stone by barium ions occurs rapidly (at room temperature, in the course of one or two hours) and, in the case of the Salem limestone blocks treated by the process of this invention, was observed to extend uniformly to a depth of about 2 centimeters into the stone. Thus, the prisms, whose smallest dimension was one inch, were found to be uniformly impregnated throughout their volumes. The cubes and bricks, whose smallest dimension was two inches, were barium-impregnated for about ¾ inch in from each side, leaving an unimpregnated region about ½ inch in depth in the center.

A second characteristic feature observed in the treated stone is the formation of new, needle-like crystal growths in the form of a fine "beard" over the surfaces of original particles and in pores, and forming bridges and bonds between particles. The new growths are shown in FIGS. 1 and 2 by reference number 200. The new growth is principally barium carbonate and is joined to the original particle surfaces through the series of barium calcium carbonate solid solutions discussed previously. These new crystal growths form more slowly than the exchange of barium for calcium which produces the reaction rims at the surfaces of the original particles. Under the conditions of the present experiments, the new crystal growths are observed to extend into the stone to a depth of about one centimeter from the outer surfaces.

The presence of barium carbonate in the treated stone, and its approximate correspondence in amount with the petrographic observations, are confirmed by the X-ray powder diffraction spectra of the treated and control prisms. The observed relative intensities of the barium carbonate peak at 3.72 A. and the calcite peak at 3.035 A. correspond to a BaCO₃ content of about 1.5%, and this agrees with wet chemical analyses for the ratio of Ba and Ca in these specimens.

(4) Mechanical properties.—The blocks were exposed to the atmosphere for one month in the environment of New York City. The results of the A.S.T.M. standard tests of the mechanical properties of the treated and control specimens show that (1) the abrasion resistance of the treated stone is about 50% greater than that of the controls, (2) the water absorption of the treated stone is reduced by about 10% relative to the controls, (3) the specific gravity of the treated stone is about 2.2% greater than that of the controls, (4) the modulus of rupture and the compressive strength are not detectably different (within the rather considerable probable error of 6–10%) for the treated and control specimens. Groups A and B of the controls showed no statistical differences between the groups.

These results are consistent with the insights developed in the preceding into the nature of the modification of the stone caused by the treatment process. Average bulk properties, such as modulus of rupture, compressive strength, and specific gravity should only be affected to the extent that the 1.5% of new component has mechanical properties differing from those of the preponderant component. Thus, if barium carbonate (specific gravity 4.4) replaces calcite (specific gravity 2.7) to the extent of 1.5%, the specific gravity would increase by $$(1.7/2.7) \times 1.5 = 0.95\%$$

It is probable that the modulus of rupture and the compressive strength of barium carbonate are not sufficiently different from the corresponding properties of calcite to permit detection when the latter has been impregnated with only 1.5% of the former.

On the other hand, properties such as abrasion resistance and absorption are sensitive to the manner and form of impregnation with the minor component, and show effects that are many times greater than the simple proportion of the impregnant. The marked increase in abrasion resistance is particularly striking. It is due in part to the particle-to-particle cementation produced by the barium carbonate, and in part to the substantially greater hardness in the reaction rims of barium carbonate and of the barium calcium carbonate solid solutions compared to calcite.

A method for preparing a preferred composition for use in this invention comprises: heat 2.5 liters of water to the boiling point, and add with stirring 800 grams of barium hydroxide monohydrate, $Ba(OH)_2 \cdot H_2O$. Filter while hot to remove the barium carbonate that is generally present to the extent of several percent of the weight of the barium hydroxide solid, allow the filtrate to run into 1.0 liter of colorless glycerin with stirring, and bring the total volume to 4.0 liters by the addition of water. Allow to cool, and filter again, if necessary. Store this solution until ready to use.

Just before use, add to the solution 50 grams of urea per liter of the above solution. The final solution, containing the urea, will slowly deposit barium carbonate upon standing at room temperature. This does not interfere with its efficacy, and the solution retains its useful properties for at least several months at room temperature.

The composition is thus:

20% by weight $Ba(OH)_2 \cdot H_2O$
25% by volume glycerin
5% by weight urea

These proportions are not critical, and they may be varied, as indicated above. The proportions given above have been found to be the best for the average type of weathered limestone and marble. Precautions should be taken in handling the barium hydroxide solution, which is toxic and slightly caustic.

Any method for coating a solid surface with an aqueous liquid may be employed. This includes brushing, spraying, sponging, immersion, etc.

A thin coat of the liquid is applied, and the rate at which it is absorbed is noted. If the stone is porous, the liquid will be rapidly absorbed. Additional coats are applied until the surface retains a wet appearance for at least five minutes, showing that the stone has imbibed enough liquid to fill its pores to a depth of at least several millimeters. The actual depth of penetration of the liquid, and the amount of liquid required per unit area of the stone surface, depend upon the porosity of the stone and the degree of weathering, and can vary in specific cases from less than 100 ml. per square meter to more than 1000 ml. per square meter.

The surface treated with the liquid formula acquires a wet appearance, that is, it appears darker in color and more translucent than the untreated stone. This effect persists for several weeks and may last in some cases for six months to a year. It is due to the fact that the formula contains glycerin, which is relatively non-volatile. However, depending upon local climatic conditions of temperature, sunlight and rainfall, the glycerine eventually disappears, and the stone surface returns to its original color and texture, except that there is a tendency for the color to be somewhat whiter than prior to the treatment. This whitening effect is usually very desirable and attractive in the case of white and light-colored stones.

The results of the treatment, after sufficient time has been allowed for full development of the effects, is to deposit a thin layer of barium carbonate upon all the microscopic crystal surfaces of the particles composing the stone. This occurs not only at the surface but also beneath the surface to whatever depth the solution penetrated during the application step. The deposition of the barium carbonate occurs slowly, extending over the entire period during which the stone surface has the slightly wet appearance described above. Under these conditions, the barium carbonate is molecularly and crystallographically bound into the stone particles' surfaces, and also forms crystalline bridges and contacts between the tiny particles, thereby greatly strengthening the stone and improving its abrasion resistance.

Of even greater significance is the fact that the surfaces that are now exposed to the environment and atmosphere are chemically modified. Instead of consisting in part or whole of calcium carbonate, which is very susceptible to the attack of sulfur oxides in the air, it is now barium carbonate. This changes into barium sulfate during the course of air exposure and weathering and the barium sulfate forms a coating on the particles of the stone. This protective coating completely prevents further dissolution of the stone by rain water, ground water, air pollutants, etc. Furthermore, it prevents the disfiguring streaking and discoloration that present day atmospheres produce on ordinary limestone and marble.

Having thus provided a written description of my invention, it should be understood that the appended claims define the scope thereof.

I claim:

1. A process for improving the weathering properties of stone containing at least 10% calcium carbonate which comprises immersing said stone in an aqueous solution containing at least about 0.01% by weight of hydroxides or soluble salts of barium or strontium and at least about 0.01% by weight of a compound which decomposes in alkaline solution to release carbon dioxide and maintaining said stone in said solution for a period of time sufficient to improve its crystallographic structure by the formation of new crystal growths between particles of the stone wherein said period of time is at least about one day and up to about one month, said period of time being inversely proportional to the temperature of said solution which is from about 10° to 100° C.

2. The process of claim 1 wherein said period of time is about one week to about one month at room temperature.

3. A process according to claim 1 wherein said compound which decomposes in alkaline solution is urea in an amount from 3 to 20% by weight.

4. The process of claim 1 wherein said solution is maintained at a temperature of 50 to 95° C. and said stone is immersed in said solution for a period of at least one day.

5. A process for improving the weathering properties of stone containing at least 10% calcium carbonate which comprises contacting said stone with an aqueous solution containing at least about 0.01% by weight of hydroxides or soluble salts of barium or strontium and at least about 0.01% by weight of a compound which decomposes in alkaline solution to release carbon dioxide and maintaining said stone in a moist condition for a period of time of at least about one week and up to about five weeks to improve its crystallographic structure by the formation of new crystal growths between particles of the stone.

6. A process according to claim 5 where said compound which decomposes in alkaline solution is urea in an amount from 3 to 20% by weight.

7. A process according to claim 5 wherein said compound which decomposes in alkaline solution is selected from the group consisting of urea, parabanic acid, alloxan, barbituric acid, allantoin, hydantoin, uric acid, ethyl carbonate, urethane, ammonium carbamate, biuret, semicarbazide, cyanamide and trichloroacetic acid.

8. The process of claim 5 wherein said solution comprises a humectant.

9. The process of claim 8 wherein said humectant is glycerin in an amount from 5 to 35% by volume of said solution.

10. The process of claim 5 wherein said stone is maintained moist by periodically spraying it with water.

11. The process of claim 5 wherein said stone is maintained moist by placing over it a protective covering sheet.

12. The process of claim 5 wherein said solution comprises an aqueous solution at least saturated with barium hydroxide, and containing from 1 to 10% urea by weight and from 5 to 35% glycerin by volume.

13. The process of claim 1 wherein said solution comprises from about 5 to about 10% by weight of hydroxides or soluble salts or barium or strontium.

14. The process of claim 5 wherein said solution is at least saturated with a hydroxide or soluble salt of barium or strontium.

15. The process of claim 5 wherein said solution comprises:
5 to 75 parts by weight humectant;
95 to 25 parts by weight water; and
for each 100 parts by weight of humectant-water mixture:
1 to 30 parts by weight of a hydroxide or soluble salt of barium or strontium, and
1 to 50 parts by weight of a compound which decomposes in alkaline solution to release carbon dioxide.

16. A composition, for applying to stone to improve its weathering properties, which comprises:
5 to 75 parts by weight humectant;
95 to 25 parts by weight water; and
for each 100 parts by weight of humectant-water mixture:
1 to 30 parts by weight of a hydroxide or soluble salt of barium or strontium, and
1 to 50 parts by weight of a compound which decomposes in alkaline solution to release carbon dioxide.

17. The composition of claim 16 wherein said compound which decomposes in alkaline solution is urea.

18. The composition of claim 16 wherein said compound which decomposes in alkaline solution is selected from the group consisting of urea, parabanic acid, alloxan, barbituric acid, allantoin, hydantoin, uric acid, ethyl carbonate, urethane, ammonium carbamate, biuret, semi-carbazide, cyanamide and trichloroacetic acid.

19. The composition of claim 16 which comprises an aqueous solution at least saturated with barium hydroxide and containing from 1 to 10% urea by weight and from 5 to 35% glycerin by volume.

20. The composition of claim 16 wherein said humectant is glycerin.

References Cited

FOREIGN PATENTS

| | | |
|---|---|---|
| 220 | 1/1862 | Great Britain. |
| 13,761 | 10/1884 | Great Britain _____ 106—12 |

OTHER REFERENCES

Lewin, S. Z., Art and Archaeology—Technical Abstracts, vol. 6, 1966, No. 1, pp. 185–277.

LORENZO B. HAYES, Primary Examiner

U.S. Cl. X.R.

117—123; 264—79